(12) United States Patent
Hokkirigawa et al.

(10) Patent No.: US 7,140,778 B2
(45) Date of Patent: Nov. 28, 2006

(54) SYNTHETIC RESIN COMPOSITES AND BEARINGS FORMED THEREFROM AND METHOD

(75) Inventors: Kazuo Hokkirigawa, Sendai (JP); Motoharu Akiyama, Miyota-Machi (JP); Morinobu Kawamura, Miyota-Machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/377,851

(22) Filed: Feb. 28, 2003

(65) Prior Publication Data

US 2004/0013333 A1    Jan. 22, 2004

(30) Foreign Application Priority Data

| Mar. 1, 2002 | (JP) | 2002-055307 |
| Mar. 1, 2002 | (JP) | 2002-055308 |
| Mar. 7, 2002 | (JP) | 2002-062406 |
| Mar. 7, 2002 | (JP) | 2002-062412 |
| Jun. 17, 2002 | (JP) | 2002-176436 |
| Sep. 18, 2002 | (JP) | 2002-272147 |

(51) Int. Cl.
*F16C 33/02* (2006.01)

(52) U.S. Cl. ............ 384/276; 384/297; 384/907

(58) Field of Classification Search ............ 384/297, 384/276, 299, 625, 907, 908
See application file for complete search history.

(56) References Cited

U.S. PATENT DOCUMENTS

| 2,128,087 A | 8/1938 | Gatke ............ 384/298 |
| 3,768,640 A | 10/1973 | Piscatelli ............ 206/50 |
| 4,115,283 A | 9/1978 | Needham |
| 4,196,013 A | 4/1980 | Dannenberg et al. |
| 4,466,932 A | 8/1984 | Koyama et al. |
| 4,699,573 A | 10/1987 | Petrie et al. |
| 4,877,813 A * | 10/1989 | Jinno et al. ............ 525/146 |
| 4,960,827 A | 10/1990 | Miyazaki et al. ............ 525/131 |
| 5,026,762 A | 6/1991 | Kida et al. ............ 524/495 |
| 5,236,784 A | 8/1993 | Kobayashi et al. |
| 5,304,422 A | 4/1994 | Tanabe et al. ............ 428/392 |
| 5,346,737 A | 9/1994 | Takahashi et al. |
| 5,357,163 A | 10/1994 | Minakuchi et al. ............ 310/90 |
| 5,360,633 A | 11/1994 | Dean |
| 5,432,213 A | 7/1995 | Kim et al. |
| 5,432,224 A | 7/1995 | Ryugoh et al. ............ 524/439 |
| 5,549,394 A | 8/1996 | Nowak et al. |
| 5,591,279 A | 1/1997 | Midorikawa et al. ........ 152/209.4 |
| 5,641,275 A | 6/1997 | Klein et al. |
| 5,697,709 A | 12/1997 | Mori et al. |
| 5,730,916 A | 3/1998 | Künzel et al. |
| 5,731,373 A | 3/1998 | Hirose et al. ............ 524/447 |
| 5,762,699 A | 6/1998 | McGovern |
| 5,879,791 A | 3/1999 | Kato et al. |

(Continued)

FOREIGN PATENT DOCUMENTS

CN    1301892 A    7/2001

(Continued)

OTHER PUBLICATIONS

Kazuo Hokkirigawa, Kino Zairyo "Functional Materials", vol. No. 5, pp. 24-28, (May 1997).

(Continued)

*Primary Examiner*—Thomas R. Hannon
(74) *Attorney, Agent, or Firm*—Ostrolenk, Faber, Gerb & Soffen, LLP (57) ABSTRACT

A resin composite for use in the manufacture of slide bearings is formed of a resin and fine particles of RBC or CRBC dispersed in the resin. The resin composite can be molded into slide bearings.

37 Claims, 5 Drawing Sheets

U.S. PATENT DOCUMENTS

| | | |
|---|---|---|
| 5,916,499 A | 6/1999 | Murayama et al. |
| 6,033,118 A | 3/2000 | Asai et al. |
| 6,095,770 A | 8/2000 | Obata et al. |
| 6,109,887 A | 8/2000 | Takura et al. |
| 6,193,793 B1 | 2/2001 | Long et al. |
| 6,196,722 B1 | 3/2001 | Asada et al. ................. 384/107 |
| 6,211,592 B1 | 4/2001 | Ichiyama ..................... 310/90 |
| 6,342,088 B1 | 1/2002 | Klatt et al. |
| 6,395,677 B1 | 5/2002 | Hokkirigawa et al. |
| 6,404,087 B1 | 6/2002 | Ichiyama ..................... 310/90 |
| 6,448,307 B1 | 9/2002 | Medoff et al. |
| 6,456,458 B1 | 9/2002 | Ichiyama ................. 360/99.08 |
| 6,472,042 B1 | 10/2002 | Dibbern et al. |
| 6,494,928 B1 | 12/2002 | Hokkirigawa et al. |
| 6,513,979 B1 | 2/2003 | Mori .......................... 384/107 |
| 6,550,508 B1 | 4/2003 | Yamaguchi et al. ......... 152/167 |
| 6,573,215 B1 | 6/2003 | Hokkirigawa et al. ...... 502/402 |
| 6,582,130 B1 | 6/2003 | Yokouchi et al. ........... 384/492 |
| 6,685,356 B1 | 2/2004 | Hirata ........................ 384/100 |
| 6,712,517 B1 | 3/2004 | Hokkirigawa et al. ...... 384/279 |
| 6,787,075 B1 | 9/2004 | Hokkirigawa et al. ..... 264/29.4 |
| 2002/0111388 A1 | 8/2002 | Hokkirigawa et al. |
| 2002/0114548 A1 | 8/2002 | Hokkirigawa et al. |
| 2002/0114549 A1 | 8/2002 | Hokkirigawa et al. |
| 2002/0152644 A1 | 10/2002 | Hokkirigawa et al. |
| 2002/0152694 A1 | 10/2002 | Hokkirigawa et al. |
| 2002/0152697 A1 | 10/2002 | Hokkirigawa et al. |
| 2002/0158529 A1 | 10/2002 | Liu et al. ................... 310/90.5 |
| 2002/0174605 A1 | 11/2002 | Hokkirigawa et al. |
| 2002/0174771 A1 | 11/2002 | Hokkirigawa et al. |
| 2002/0175118 A1 | 11/2002 | Hokkirigawa et al. ...... 210/266 |
| 2002/0192469 A1 | 12/2002 | Hokkirigawa et al. ...... 428/402 |
| 2003/0048577 A1 | 3/2003 | Kayama et al. .......... 360/99.08 |
| 2003/0134104 A1 | 7/2003 | Hokkirigawa et al. ... 428/317.9 |
| 2003/0220421 A1 | 11/2003 | Hokkirigawa et al. ......... 524/9 |
| 2003/0229161 A1 | 12/2003 | Hokkirigawa et al. ........ 524/15 |
| 2004/0132881 A1 | 7/2004 | Okamiya et al. ........... 524/284 |
| 2004/0165791 A1 | 8/2004 | Kaltanji ..................... 382/305 |

FOREIGN PATENT DOCUMENTS

| | | |
|---|---|---|
| DE | 23 45 460 A1 | 3/1975 |
| EP | 1 344 791 A1 | 9/2003 |
| JP | 05-032797 | 2/1993 |
| JP | 07-268126 | 10/1995 |
| JP | 10095647 | 4/1998 |
| JP | 10219031 A | 8/1998 |
| JP | 11021407 | 1/1999 |
| JP | 2000-266052 | 9/2000 |
| JP | 2001-002742 | 1/2001 |
| JP | 2001-89273 A | 4/2001 |
| JP | 2001-304263 | 10/2001 |
| JP | 2002284553 | 10/2002 |
| SU | 1835412 A1 | 8/1993 |

OTHER PUBLICATIONS

Official Publication of Toku Kai Hei 5-32797.

Official Publication of Toku Kai Hei 7-268126.

Database WPI Section Ch, Week 199510, Derwent Publications Ltd., London, GB; AN 1995-073867, XP002247952 & SU 1 835 412 A (Dnepr Chem Techn Inst), Aug. 23, 1993.

Kazuo Hokkirigawa, "Development of Hard Porous Carbon Materials "RB Ceramics" by Using Rice Bran," vol. 17, No. 5, pp. 24-28 (May 1997).

English translation of CN 1301892A.

* cited by examiner

SYNTHETIC RESIN COMPOSITES AND BEARINGS FORMED THEREFROM AND METHOD

BACKGROUND OF THE INVENTION

1. Field of the Invention

The present invention relates to synthetic resin composites having singular tribological properties for bearings, and more particularly to bearings such as slide bearings molded therefrom.

2. Description of the Related Art

A bearing is defined as a means of positioning one part with respect to another in such a way that relative motion is possible. This relative motion and its type are dictated by how the bearing will be used. Bearings are designed by determining the mechanical functions in which the bearings must perform, the bearing's life and reliability requirements, and the bearing's ambient conditions, including temperature, corrosive atmospheres, and vibration.

One type of bearings is a slide bearing, in which the bearing elements are usually separated by a film of lubricant (e.g., oil or grease) and in which a sliding motion is the predominant element. Another type of bearing is a rolling-element bearing.

Slide bearings include all varieties of bearings in which the primary motion is a sliding of one surface over another. A sleeve bearing which is used to position a shaft or movable part in a radial direction is an example of a slide bearing.

Rolling-element bearings include ball bearings, roller bearings, and needle bearings. Both ball and roller bearings are made and designed to carry either radial or thrust loads or both. Needle bearings, in general, are restricted to radial loads.

Slide bearings, in general, require relatively large amounts of lubricant (e.g., oil) in order to maintain a lubricant film between the surfaces. Lubricants vary widely from fluids of all types, including water, oil, soaps, greases and air, to solid lubricants such as graphite and molybdenum disulfide. Unless the loads are very low, the pressure that is generated in the lubricant film to support the load also drives lubricant out of the bearing. Lubricant lost in this manner must be continuously replenished.

Synthetic resins, such as polyamides, polyesters, and polyolefins, e.g., polypropylene, polyethylene and polyacetals are known to be used in the manufacture of sliding members, such as slide bearings. Polyamides, particularly nylon 66, are preferred for their mechanical, chemical, and physical properties, which are especially useful for slide bearings. See, for example, Official Publication of Toku Kai Hei 5-32797.

RBC (RB ceramics) and CRBC (CRB ceramics) are also known as moldable carbon materials. See, for example, Kazuo Hokkirigawa, Kino Zairyo "Functional Materials", Vol. 17, No. 5, pp. 24–28 (May 1997).

Lubricant resin composites are also known. These composites are prepared by adding from 5 to 40 parts by volume of a solid lubricant to 100 parts by volume of a fiber-reinforced resin made of from 60 to 95 volume percent synthetic resin and from 40 to 5 volume percent carbon fibers. See, for example, Official Publication of Toku Kai Hei 7-268126.

SUMMARY OF THE INVENTION

It has now been found that synthetic resin composites, especially polyamide composites, containing RBC or CRBC within a certain range as fillers, possess singular sliding characteristics that are useful in the manufacture of slide bearings.

More particularly, the present invention is directed to a synthetic resin composite for slide bearings having fine particles of RBC or CRBC uniformly dispersed in the resin. Preferably, the mass ratio between the particles and the resin is about 30 to 70:70 to 30. Preferably, the fine particles of RBC or CRBC have a mean particle size about 300 μm or less, and preferably in the range between about 10 and 200 μm.

The present invention is also directed to a slide bearing formed from such a synthetic resin composite.

Other features and advantages of the present invention will become apparent from the following description of the preferred embodiments.

DESCRIPTION OF THE PREFERRED EMBODIMENTS

RBC and CRBC materials are used in the preferred embodiments of the invention. The RBC and CRBC are advantageous because they possess the following qualities:
1. they are very hard;
2. when they are made into grains, their shape is irregular;
3. their expansion coefficient is extremely small;
4. they are electrically conductive;
5. their specific gravity is low and they are light and porous;
6. their friction coefficient is extremely small; and
7. their resistance to friction is superior.

Moreover, because the materials are based on rice bran, there is no adverse effect upon the earth's environment and they serve to preserve natural resources.

To produce RBC or CRBC, rice bran is preferably used as a starting material because of its low cost. It is discharged as a by-product of other processes in an amount of 900,000 tons per year in Japan alone and 33,000,000 tons per year throughout the world.

RBC is a carbon material made, for example, by mixing and kneading a de-fatted bran, preferably obtained from rice bran (de-fatted rice bran), with a thermally cured or thermosetting resin, molding the mixture under pressure, drying the molded product, and then firing the dried product in an inert gas atmosphere, e.g., sintering. See Kazuo Hokkirigawa, Kino Zairyo (Functional Materials), Vol. 17, No. 5, pp. 24–28 (May 1997).

Preferably, the thermosetting resin that is mixed with the de-fatted rice bran can be any resin that is cured by heating or is heat hardened. Preferred resins include, but are not limited to, phenolics, diaryl phthalate resins, unsaturated polyester resins, epoxies, polyimides, triazine resins and the like. Phenolic resins, particularly resols, are especially preferred. One or more thermoplastic resins, such as polyamides and the like, can also be included.

Preferably, the mixing ratio of the de-fatted bran to the thermosetting resin should be about 50 to 90:50 to 10 (50:50 to about 90:10). A ratio of about 75:25 is more preferred.

Once mixed, the de-fatted bran and the resins are molded under pressure, pulverized (crushed) and then fired in a rotary kiln, e.g., sintered. Preferably, the firing temperature is in the range of about 700 to 1000° C. The firing time is in the range of about 40 to 140 minutes.

When preparing RB ceramics, the contraction ratio between the dimensions of a molded product formed under pressure and the dimensions of a finished molded product that has been fired in an inert gas atmosphere can vary by as much as 25%. As a result, it is difficult to prepare an accurately molded product.

CRB ceramics (CRBC) have been developed to reduce this problem. CRBC is a carbon material that is an improvement over RBC. It is a black, porous resin. The contraction ratio for CRB ceramics is extremely small, i.e., less than 3%.

To prepare a CRBC, for example, de-fatted bran, again preferably obtained from rice bran, and a thermosetting resin are mixed and kneaded, and then first fired in a rotary kiln in an inert gas atmosphere at a temperature in the range of about 700° to 1000° C., e.g., sintered. Preferably, the thermosetting resin is a low molecular weight liquid resin. The firing time is about 40 and 120 minutes.

The resulting material is then pulverized to less than 100 mesh to obtain carbonized powder. The powder is then mixed with a thermosetting resin, and molded under pressure in the range of about 20 Mpa to 30 Mpa, preferably about 21 to 25 Mpa. The molded product is again heat-treated in an inert gas atmosphere at a temperature in the range of about 300° to 1100° C., e.g., sintered. Preferably, the temperature of the metal mold is about 150° C. or higher. The inert gas used for the heat treatments can be helium, argon, neon, or nitrogen. Nitrogen is preferred.

For the second heat treatment, a satisfactorily controlled electric furnace is ordinarily used. The heat treatment time for the molded product is about 60 to 360 minutes. During heat treatment, the temperature of the furnace should be raised comparatively slowly up to 500° C. Preferably, the temperature should be raised at a rate of about 0.5° to about 3° C. per minute and, more preferably, about 1° C. per minute.

Preferably, after the heat treatment, the temperature of the furnace is lowered comparatively slowly until a temperature of about 500° C. is reached. Below 500° C., the mixture can be left to cool down naturally. Preferably, the furnace is cooled down to 500° C. at a rate of about 0.5° C. to about 4° C. per minute. More preferably, it is carried out at a rate of about 1° C. per minute.

Preferably, the RBC or CRBC is dried after molding at a temperature above 100° C.

In a preferred embodiment, the composite material of the present invention includes fine particles of RBC or CRBC, e.g., a powder, dispersed in a synthetic resin composition.

Preferably, the fine particles should constitute about 30 to 70% by weight of the composite material, e.g., the weight or mass ratio between the fine particles and the resin should be about 30 to 70:70 to 30 (about 30:70 to about 70:30). More preferably, the fine particles of RBC or CRBC should constitute about 45 to 55% by weight, which is especially desirable. It has been found that if the ratio exceeds 70 weight percent, the mechanical properties of the composite diminish. If it is less than 30 weight percent, the lubricant oil holding capacity decreases.

It has also been found that when the fine particles of RBC or CRBC are evenly dispersed in a range between about 30 to 70 weight percent, preferably in a range between about 45 to 55 weight percent of the entire composite, and then molded, the composite has high or elevated lubricant oil holding properties or preservation capacity.

Preferably, the fine particles of RBC or CRBC used in the present invention should have a mean particle size of about 300 μm or less. Particularly, it has been found that when a synthetic resin composite is formed comprising about 30 to 70 weight percent of the fine particles having a mean particle size in the range of about 10 to about 200 μm, the composite surface has a high lubricant oil holding capacity. This allows the composite material to be particularly suited as a material for slide bearings.

In a preferred embodiment, the composite material of the present invention is prepared by mixing fine particles of the RBC or CRBC at a temperature in the vicinity of the melting point of the synthetic resin, followed by kneading to uniformly disperse the particles in the resin. As stated above, the RBC or CRBC should constitute about 30 to 70% by weight of the composite material. Preferably the RBC or CRBC should constitute about 45 to 55% by weight.

Preferably, the synthetic resins that are mixed with the RBC and the CRBC are thermoplastic resins. Examples of these resins include, but are not limited to, polyacetal, polyamide, polyester, polyolefins, and the like. In particular, the following resins can be used: POM (polyacetal, i.e., polyoxymethylene), nylon 66 (polyhexamethylene adipamide), nylon 6 (polycapramide), nylon 11 (polyundecanamide), nylon 12, polybutylene terephthalate, polyethylene teraphthalate, polypropylene, polyethylene, and other thermoplastic resins. Among these, POM, nylon 66, nylon 11, polybutylene terephthalate, polypropylene, and the like are more preferred. Nylon 66 is most preferred. These thermoplastic resins can be used either alone or in combination.

In another aspect of the present invention, the thermoplastic resin or resins can be used in combination with one or more thermosetting resins. Thermosetting resins that can be used include, but are not limited to, phenolics, diaryl phthalate resins, unsaturated polyester resins, epoxies, polyimides, triazine resins, and the like.

Preferably, the composite material of the present material is molded by any of the known methods such as by extrusion molding, injection molding or the like. The temperature of the mold should be relatively low, preferably in the range between the glass transition point of the synthetic resin and its fusion point. It is also preferred that the mold be cooled gradually, rather than suddenly, which will normally provide a molded product having superior surface conditions.

Preferably, one or more anti-aging agents, anti-oxidants, and/or stabilizers can be added to the composite of the present invention. Their selection will depend on the kind of synthetic resin used and is readily within the capabilities of those skilled in the art without undue experimentation.

For example, if the synthetic resin is a polyamide, an amine anti-aging agent will preferably be selected. Such amines include, but are not limited to, diaryl-p-phenylene diamines, such as, N,N'-diphenyl-p-phenylene diamine and N,N'-di-2-naphthyl-p-phenylene diamine; aryl alkyl-p-phenylene diamines, such as, N-phenyl-N'-isopropyl-p-phenylene diamine; N-phenyl-N'-(1,3-dimethyl)-p-phenylene diamine; and N-phenyl-N'-cyclohexyl-p-phenylene diamine; diphenyl amines and alkylated diphenylamines, such as 4,4'-di-octyl diphenyl amine, and the like.

Anti-oxidants that can be used in the composites of the present invention include, but are not limited to, phenolics, phosphorus compounds, and sulfur compounds.

Phenolics that can be used include, but are not limited to, 2,6-di-t-butyl-4-methyl phenol; tris(3,5-di-t-butyl-4-hydroxybenzyl) isocyanurate; tetra (methylene-3-(3,5-di-t-butyl-4-hydroxyphenyl) propionate methane; n-octadecyl-3-(3',5'-di-t-butyl-4'-hydroxy phenyl) propionate; 4,4'-butylidene-(3-methyl-6-t-butyl phenol); triethylene glycol-bis(3-(3-t-butyl-4-hydroxy-5-methylphenyl) propionate); 3,9-bis(2-(3(3-t-butyl-4-hydroxy-5-methyl phenyl) propionyloxy)-1,1-dimethyl ethyl)-2; 4,8,10-tetraoxaspyro (5,5) undecane; and the like.

Phosphorus compounds include, but are not limited to, tris-nonylphenyl phosphite; distearyl pentaerythritol diphosphite; tris-(2,4-(di-t-butyl phenyl) phosphite; tetra (2,4-di-t-butylhenyl)-4,4'-biphenylene-di-phosphonite; bis-(2,4-di-t-butyl-phenyl)pentaerythritol diphosphite; bis-(2,6-di-t-butyl-4-methylphenyl) pentaerythritol-diphosphite; 2,2-methylene bis(4,6-di-t-butyl phenyl) octyl phosphite; and the like.

Sulfur compounds include, but are not limited to, dilauryl-3,3'-thiodipropionate; dimyristyl-3,3'-thiopropionate; distearyl-3,3'-thiodipropionate; pentaerythritol tetra(3-laurylthio propionate); and the like.

The stabilizers that can be added to the composites of the present invention include, but are not limited to, heat stabilizers, such as phosphoric and phosphorous acid esters, and photo-stabilizers, such as hindered amines, phenyl benzoates, complex salts of nickel, and the like.

The hindered amines and phenyl benzoate photo-stabilizers include, for example, but are not limited to bis(2,2,6,6-tetramethyl-4-piperidyl) sebacate; the condensates of succinic acid and N-(2-hydroxypropyl)-2,2,6,6-tetramethyl-4-hydroxypiperidine; 1,2,3,4-butane tetracarboxylate; the condensates of N,N'-bis-(2,2,6,6-tetramethyl-4-piperidyl) hexamethylene diamine and 1,2-dibromoethane; bis-(2,2,6, 6-tetramethyl piperidyl) adipate; bis-(2,2,6,6-tetramethyl piperidyl) fumarate, poly((6-(1,1,3,3-tetramethyl butyl) imino-1,3,5-triazine-2,4-diil); ((2,2,6,6-tetramethyl-4-piperidyl) imino) hexamethylene; ((2,2,6,6-tetramethyl-4,4-piperidyl) imino)); 2,4-t-butyl phenyl-3,5-di-t-butyl-4-hydroxy benzoate; 4-octyl phenyl-3,5-di-t-butyl-4-hydroxy benzoate; n-hexadecyl-3,5-di-t-butyl-4-hydroxybenzoate; and the like.

If desired, fire retarders, e.g., halogen-containing compounds, phosphorus-containing compounds, nitrogen-containing compounds, silicon-containing compounds, and antimony compounds, can also be added to the synthetic resin composites of the present invention. Such halogen-containing compounds include, but are not limited to, tetrabromo-bisphenol A derivatives, hexabromo diphenyl ether, tetrabromo phthalic anhydride, and the like. Phosphorus-containing compounds include, but are not limited to, triphenyl phosphate, triphenyl phosphite, red phosphorus, and polyammonium phosphate, and the like; nitrogen-containing compounds include, but are not limited to, urea, guanidine, and the like; silicon-containing compounds include, but are not limited to, silicone oil, organic silanes, aluminum silicates, and the like; and antimony compounds include, but are not limited to, antimony trioxide, antimony phosphate, and the like.

Further, constitutional fillers, such as carbon black, may be added to the synthetic resin composites for the slide bearings of the present invention. Moreover, it is also possible, and often desirable, to increase the strength of the molded product by adding inorganic fibers, such as glass fiber, rock wool, carbon fibers, and the like; synthetic fibers, such as polyester, rayon, polyvinyl alcohol, polyamide, polyolefin, acrylic, and the like; or natural pulp fibers, such as wood pulp, Manila hemp, and the like.

The advantages and the important features of the present invention will be more apparent from the following examples.

EXAMPLES

Example A

Nylon 66
Preparation of Test Pieces A
One hundred (100) grams of nylon 66 pellets were used as the resin material and Test Pieces A, 50 millimeters in diameter and 3 millimeters thick, were prepared by injection molding.

Example B

Nylon 66—30 Weight Percent RBC Particulate Composite
Preparation of RBC Fine Particles
De-fatted rice bran in the amount of 75 kilograms and a liquid phenolic resin (resol) in the amount of 25 kilograms were mixed and kneaded while being heated to a temperature in the range of 50–60° C. A plastic mixture of uniform quality was obtained.

The mixture was fired in a rotary kiln at 950° C. for 120 minutes under a nitrogen atmosphere. The product was sifted through a 170-mesh sieve yielding fine RBC particles whose mean particle size was in the range of 140 to 160 μm.
Preparation of Test Pieces B
Thirty (30) grams of the fine particles of RBC whose mean particle size was 150 μm and 70 grams of nylon 66 pellets were melted and mixed. The resulting resin composite was injection molded to provide Test Pieces B that were 50 millimeters in diameter and 3 millimeters thick.

Example C

Nylon 66—50 Weight Percent RBC Particulate Composite
Preparation of RBC Fine Particles
Fine particles of RBC prepared in Example B were used.
Preparation of Test Pieces C
Fifty (50) grams of the fine particles of RBC prepared in Example A and 50 grams of nylon 66 pellets were melted and mixed. The resulting resin composite was injection molded to provide test pieces C that were 50 millimeters in diameter and 3 millimeters thick.

Example D

Nylon 66—50 Weight Percent CRBC Particulate Composite
Preparation of CRBC Fine Particles
De-fatted rice bran in the amount of 75 kilograms and a liquid phenolic resin in the amount of 25 kilograms were mixed and kneaded while being heated to a temperature in the range of 50–60° C. A plastic mixture of uniform quality was obtained.

The mixture was subjected to a first firing in a rotary kiln at a temperature of 1000° C. for 120 minutes under a nitrogen atmosphere. The resulting carbonized product was sifted through a 100-mesh sieve yielding fine RBC particles whose mean particle size was in the range of 240 to 260 μm.

Sixty-five (65) kilograms of the RBC fine particles and 35 kilograms of a solid phenol resin (resole) were then mixed and kneaded while being heated in the range of 100–150° C. A plastic mixture of uniform quality was obtained.

Next, a molded product was formed from the plastic mixture under a pressure of 22 Mpa into a ball shape having a diameter of 2 centimeters. The temperature of the metal mold was 150° C.

The molded product was extracted from the metal mold and its temperature was raised at the rate of 3° C. per minute under a nitrogen atmosphere until 500° C. was reached. The temperature was held at 500° C. for 30 minutes and then the product was fired at a temperature of 1000° C. for about 120 minutes.

Next, the temperature was lowered to 500° C. at a rate of 2–3° C. per minute, followed by natural cooling below 500° C.

Then, the CRBC molded product, which was about 2 centimeters in diameter, was pulverized and sifted through an 800-mesh sieve to yield particles whose mean particle size was 30 μm.

Preparation of Test Pieces D

Fifty (50) grams of this product was mixed and melted with 50 grams of nylon 66 pellets to yield a resin product that was injection molded to form Test Pieces D. The test pieces were 50 millimeters in diameter and 3 millimeters thick.

Example E

Nylon 66—70 Weight Percent RBC Particulate Composite

Preparation of RBC Fine Particle

Fine particles of RBC prepared in Example B were used.

Preparation of Test Pieces E

Seventy (70) grams of the fine particles of RBC prepared in Example A having a mean particle size of 150 μm and 30 grams of Nylon 66 pellets were melted and mixed and the resin composite obtained was injection molded to provide Test Pieces E that were 50 millimeters in diameter and 3 millimeters thick.

Test pieces A through E and their characteristics are shown in Tables 1 and 2.

TABLE 1

Kind of Disc (Plate) Test Pieces Test Pieces

| Test Pieces | A | B (RBC) | C (RBC) | D (CRBC) | E (RBC) |
|---|---|---|---|---|---|
| Mean Particle Size (μm) of Particulate | — | 150 | 150 | 30 | 150 |
| Weight Percent (wt %) of Particulate | 0 | 30 | 50 | 50 | 70 |

TABLE 2

Mechanical Properties of the Disc (Plate) Test Pieces

| Test Pieces | A | B | C | D | E |
|---|---|---|---|---|---|
| Tensile Strength (Mpa) | 78.5 | 57.3 | 64.6 | 78.4 | 61.4 |
| Bending Strength (Mpa) | 117.7 | 101 | 98.6 | 116 | 97.9 |
| Modulus of Bending Elasticity (Gpa) | 2.79 | 4.35 | 6.12 | 6.39 | 6.14 |
| Poisson's Ratio | — | 0.35 | 0.32 | 0.33 | 0.32 |

Measurement of Friction Properties

Figure 1A:
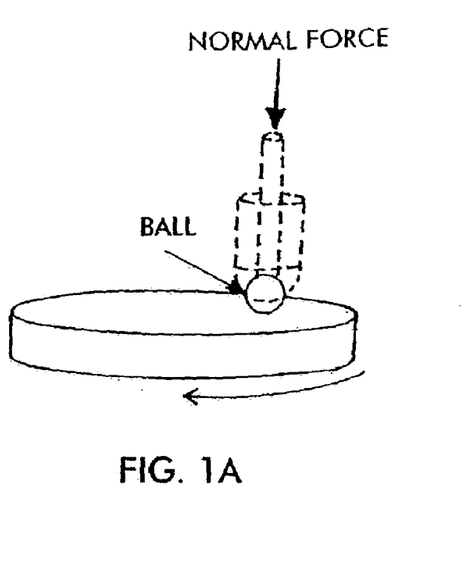
FIG. 1A generally illustrates a friction test for testing the friction characteristics of a test piece formed of a composite material of the present invention.
Figure 1B:
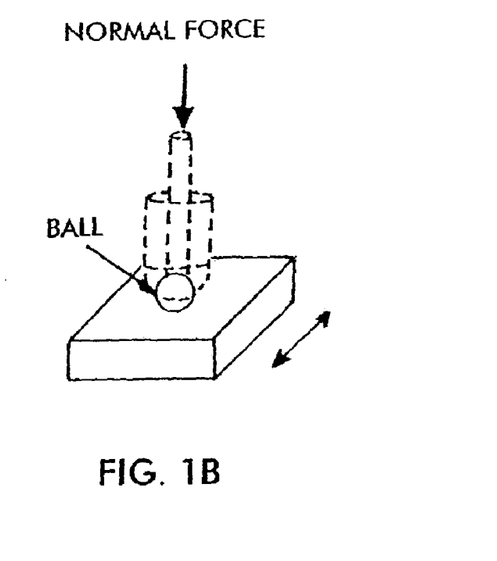
FIG. 1B generally illustrates another friction test for testing the friction characteristics of a test piece formed of a composite material of the present invention.

The Friction properties, i.e., the kinetic friction force, $f_k$, of Test Pieces A, B, C, D, and E were measured using the friction testing apparatus shown in FIGS. 1A and 1B. The dynamic (kinetic) friction coefficient, $\mu_D$, which is the ratio of the measured kinetic friction force to the applied normal force ($f_k/n$), was calculated. The test conditions are shown in Tables 3 and 4.

Coefficient of Friction and Sliding Rate

Figure 2:
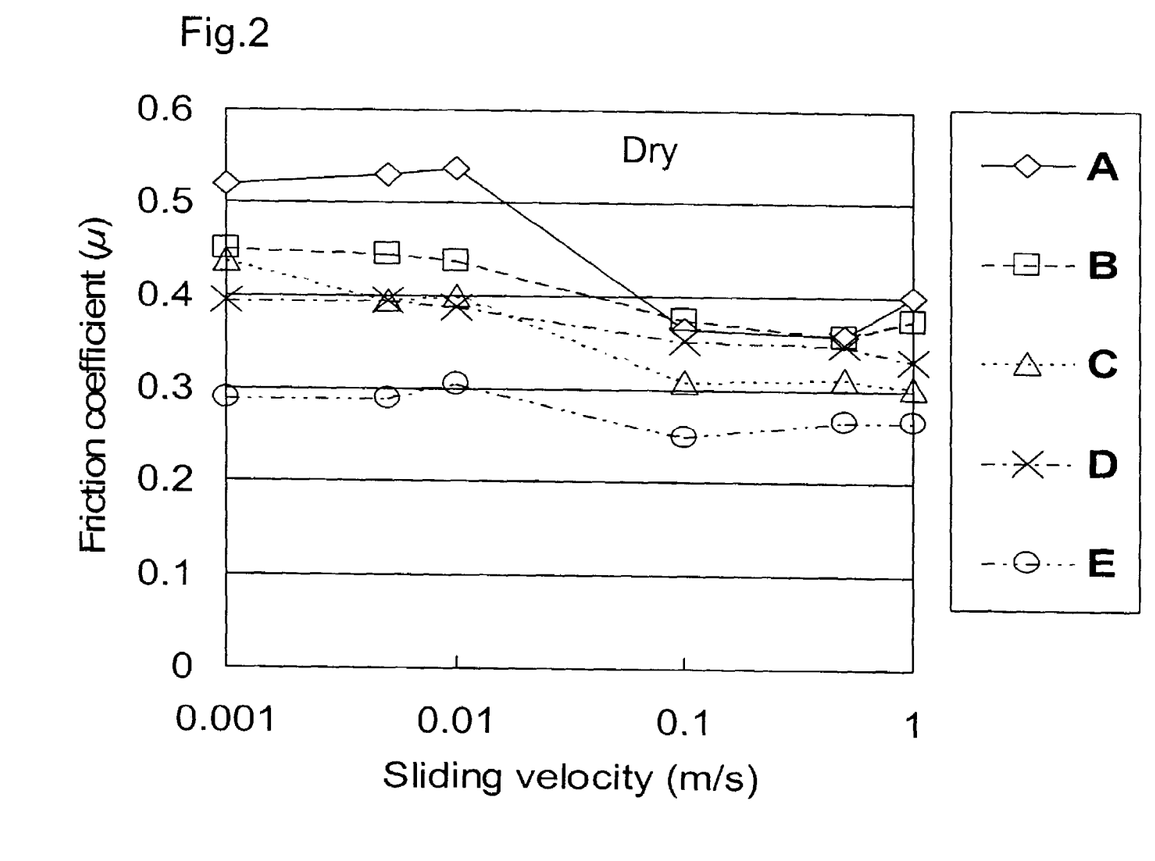
FIG. 2 is a graph showing the relationship between the coefficient of friction and sliding speed when no lubrication is present.
Figure 3:
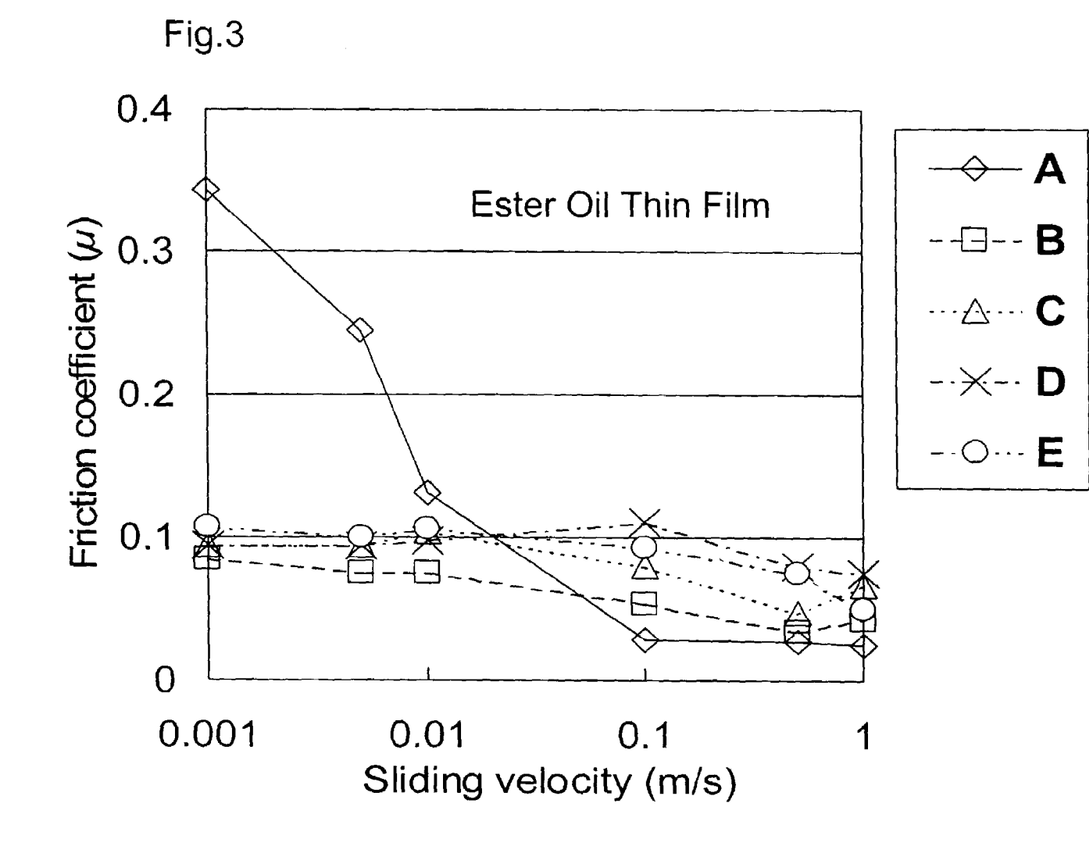
FIG. 3 is a graph showing the relationship between the coefficient of friction and sliding speed when ester oil lubrication is present.

The kinetic friction force, $f_k$, was measured under the conditions shown in Table 4, with a normal force, N, of 0.49 Newtons (N) and a sliding speed, $v_s$, from 0.001 through 1.0 meters per second, with and without lubrication by a standard ester oil lubricant. The stroke distance was 5 mm for the tests with $v_s$ from 0.001–0.01. The dynamic friction coefficient, $\mu_D$, was determined using an SUJ ball with the characteristics shown in Table 3. The results obtained are shown in FIGS. 2 and 3.

TABLE 3

Properties of SUJ2 Ball

| Radius of Curvature (mm) | 1 |
|---|---|
| Modulus of Elasticity (Gpa) | 206 |
| Poisson's Ratio | 0.3 |

TABLE 4

Experimental Conditions

| | Low Speed Range | High Speed Range |
|---|---|---|
| Perpendicular Load (N) | 0.49 | 0.49 |
| Sliding Speed (m/s) | 0.001, 0.005, 0.01 | 0.1, 0.5, 1 |
| Stroke Distance (mm) | 5 | N/A |

FIG. 2 shows the relationship between the coefficient of friction coefficient $\mu_D$ and the sliding speed, $v_s$, in meters per second (m/s) without lubrication. The value of $\mu_D$ depends on $v_s$ at low velocity, generally, such as a $v_s$ less than 0.1 m/s. Adding RBC and CRBC particulates in a composite disk lowers the coefficient of friction of a Nylon 66 base material with increasing percentage of RBC and CRBC in the composite. Also, the difference between the $\mu_D$ at $v_s$ of 0.0001 and at greater than 0.1 m/s is much less for the composites with RBC and CRBC additives, e.g., less stick-slip behavior.

FIG. 3 shows the friction coefficient $\mu_D$ versus sliding speed $v_s$ for the same tests that are completed using lubricant, ester oil (a standard lubricating oil). Again, less stick-clip behavior is shown.

In FIG. 3, a disk of Nylon 66, represented as Test Piece A in Table 1 and Table 2, shows a large drop in $\mu_D$ with increasing $v_s$. This is undesirable because it causes wear. Test Pieces B through E, which are described in Tables 1 and 2, are composites with RBC or CRBC particulate additives.

As can be seen in FIG. 3, these additives eliminate the increase in the friction coefficient $\mu_D$ at low sliding speeds. Thus, the coefficient of dynamic friction $\mu_D$ becomes comparatively independent of sliding speed $v_s$ by combining fine particles of RBC or CRBC in Nylon 66, with or without lubrication. Therefore, RBC and CRBC particulates added to a Nylon 66 matrix exhibit reduced wear compared to Nylon 66 alone.

Measurement of the Specific Wear Rate

Figure 4:
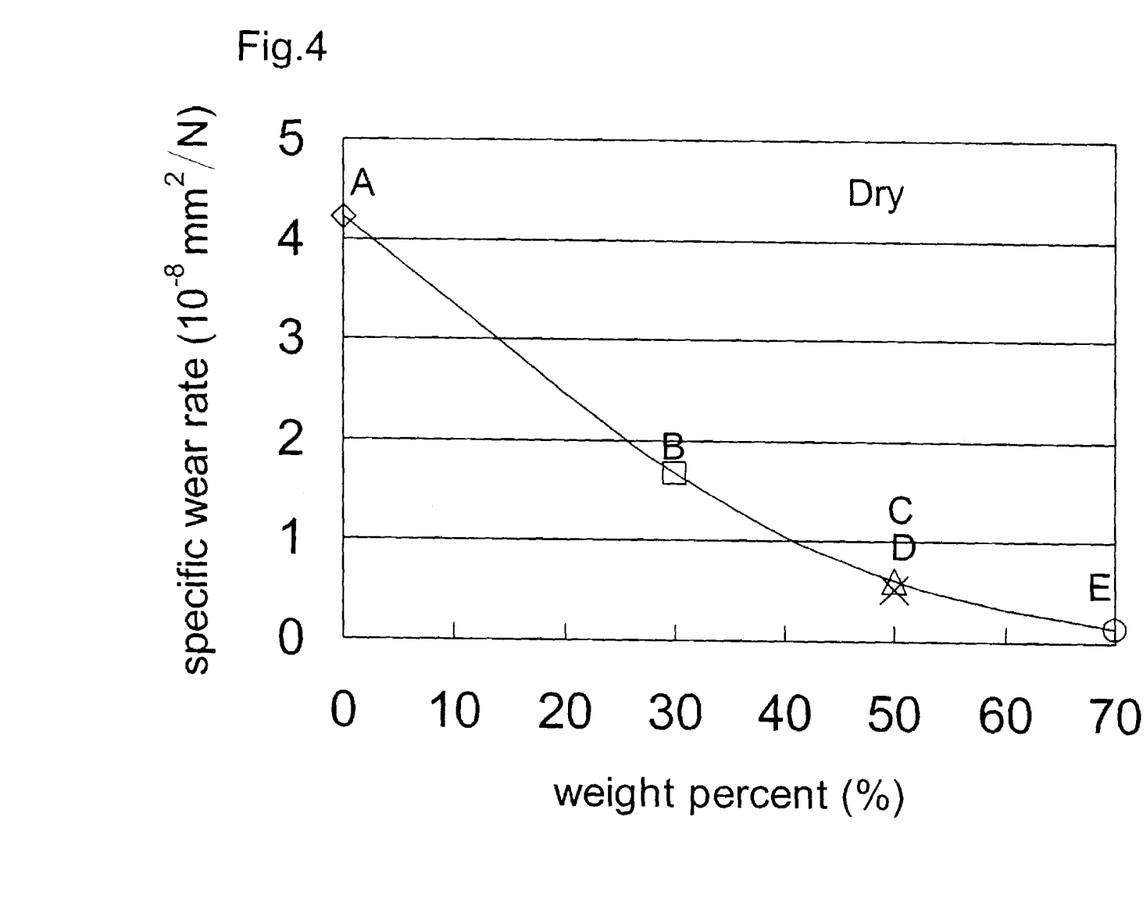
FIG. 4 is a graph showing the relationship between the specific wear rate when no lubrication is present and the RBC or CRBC content.
Figure 5:
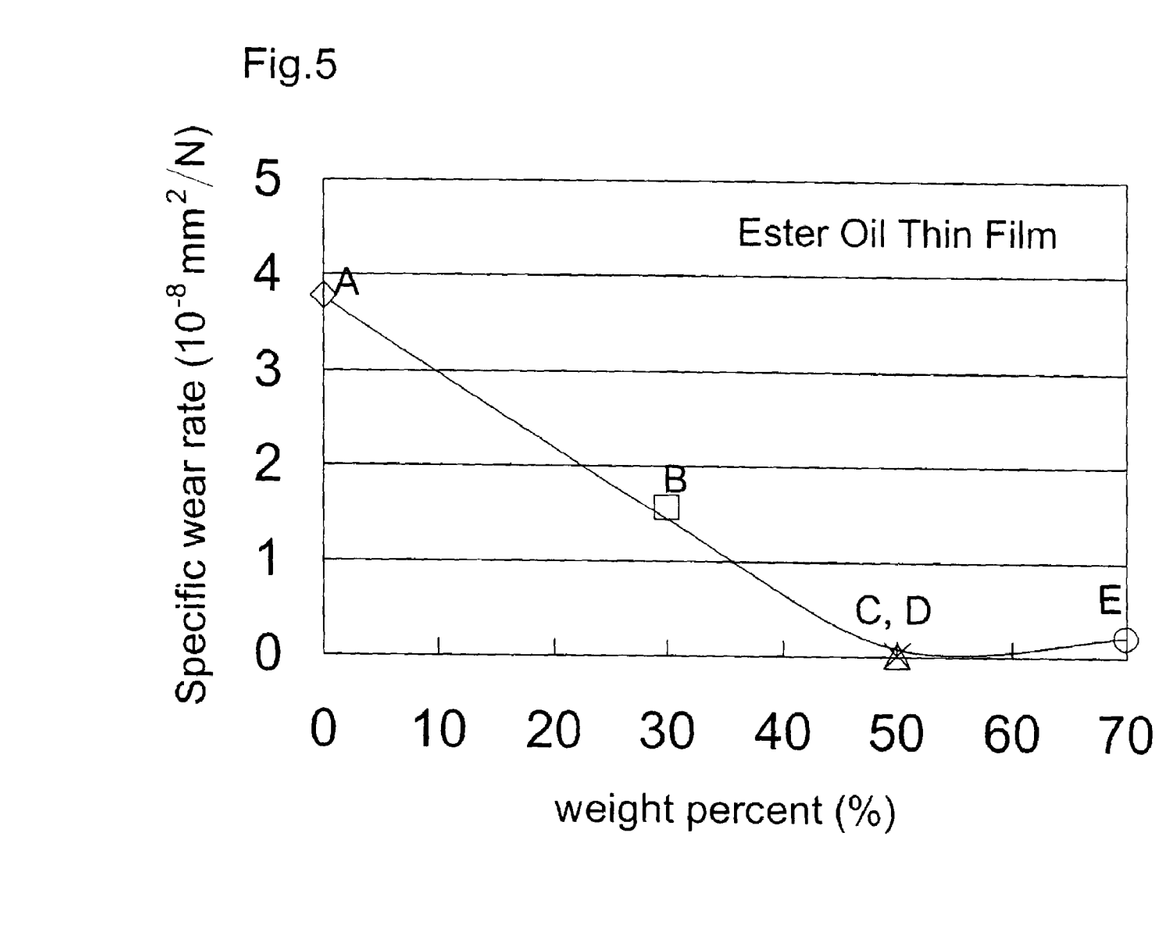
FIG. 5 is a graph showing the relationship between the specific wear rate when a thin film of ester oil lubrication is present and the RBC or CRBC content.

Friction characteristics (the specific wear rate) were measured using a ball having the characteristics shown in Table 3 under the conditions shown in Table 4, with lubrication (standard ester lubricating oil) and without lubrication. FIGS. 4 and 5 graphically show the specific wear rate versus weight fraction of the RBC and CRBC particulate additives.

FIGS. 4 and 5 generally show that the specific wear rate decreases as the amount of the RBC or CRBC particulate additives is increased. In particular, FIG. 4 shows the specific wear rate without lubrication versus the weight fraction of fine particles of RBC or CRBC added to the composite. The specific wear rate decreases with an increase of the weight fraction of RBC and CRBC particulates. For example, the specific wear rate decreases by a factor of 30 in Example E, compared to Nylon 66 without RBC or CRBC.

FIG. 5 shows the specific wear rate using a thin film of ester oil lubrication versus the weight fraction of RBC or CRBC. The thin film of ester oil was prepared by immersing, for a period of 3 minutes, the friction test piece in an ester oil, which had been solvent-diluted to 0.005 weight percent. The test piece was degassed and dried in a desiccator for two minutes, leaving a thin ester oil film on the surface.

In the case of Examples A, B, and E, the specific wear rate is approximately the same as the specific wear rate having no lubrication. Surprisingly, Examples C and D exhibit much less wear than expected. For example, the specific wear rate decreases by a factor of 300 compared to the wear rate for Example A of Nylon 66 alone. It is believed that the RBC and CRBC composites of Examples C and D, e.g., when the RBC and CRBC fine particles are present in an amount of about 50 weight percent, improve the lubricating oil holding properties of the test pieces. Thus, Examples C and D show an improvement in resistance to wear when lubricated that exceeds the expectations based solely on the weight fraction of particulate added to the composite, as determined from tests completed with no lubrication.

Example F

Sleeve

Figure 6:
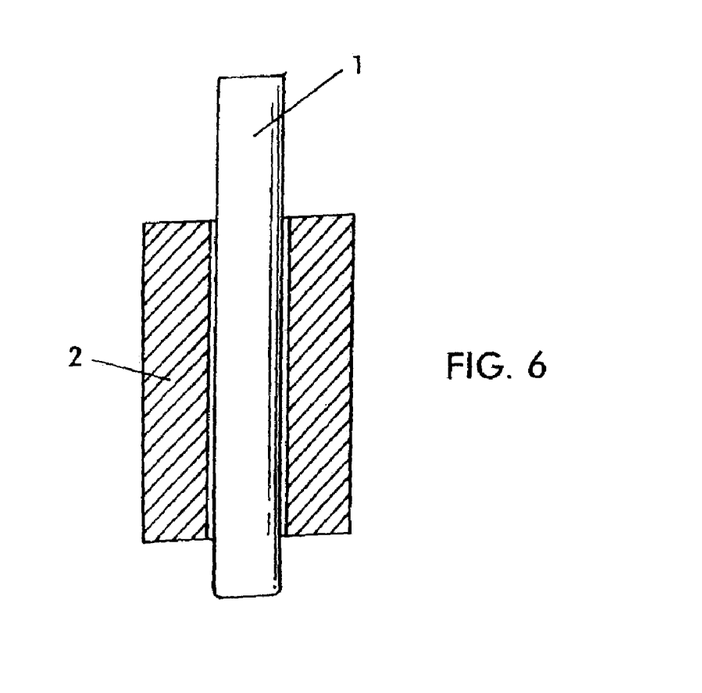
FIG. 6 shows a sleeve bearing and shaft according to the present invention.

Referring now to FIG. 6, a sleeve bearing 2 for receiving a shaft 1 were both prepared by injection molding the resin composite obtained by melting and mixing 50 grams of fine RBC particles whose mean particle size was 150 µm and 50 grams of nylon 66 pellets, which is the same weight fraction as Example C. Sleeve bearing 2 had an inner diameter of 3.00 millimeters, an outer diameter of 5.00 millimeters, and a length of 15.00 millimeters. Shaft 1, had a diameter of 2.98 millimeters and a length of 20 millimeters.

A thin film of ester oil was added by immersing, for a period of 3 minutes, the sleeve bearing 2 in ester oil, which had been solvent-diluted to 0.005 weight percent. Then, sleeve bearing 2 was degassed and dried in a desiccator for a period of two minutes. A sleeve bearing having approximately the same properties as those shown in FIG. 3, for Example C, was obtained.

Additional Examples

Fine particles, having a mean particle size of 150 µm, for example the RBC particles of Example B, and the CRBC particles of Example D were combined with nylon 6, nylon 11, nylon 12, polybutylene terephthalate, polyethylene terephthalate, polypropylene, polyethylene, and polyacetal (POM) to make synthetic resin-particulate composites. Test pieces were prepared and tested using procedures similar to Examples A–E. The results showed the same tendencies as observed in FIGS. 2–4.

As shown in FIGS. 2–4, when a composite comprising a synthetic resin having between 30 and 70 weight percent (based on the weight of the total composite) of fine particles of RBC or CRBC uniformly dispersed therein, the difference in the coefficient of dynamic friction, $\mu_D$, between the low sliding speed range and the high sliding speed range is small, the resistance to wear is good, and the lubricating oil holding property is improved compared to base material without the RBC or CRBC. As such, the composites of the present invention are useful for the manufacture of slide bearings, for example.

Although the present invention has been described in relation to particular embodiments thereof, many other variations and modifications and other uses will become apparent to those skilled in the art. The present invention therefore is not limited by the specific disclosure herein.

What is claimed is:

1. A bearing arrangement, comprising:
   at least one bearing component, wherein at least a part of the bearing component is formed of a composite including Carbonized Rice Bran Ceramic (CRBC) dispersed in a resin.

2. The bearing arrangement of claim 1, wherein the composite includes about 30 to 70% by weight of the CRBC.

3. The bearing arrangement of claim 2, wherein the composite includes about 45 to 55% by weight of the CRBC.

4. The bearing arrangement of claim 1, wherein the mass ratio between the CRBC and the resin is about 30 to 70:70 to 30.

5. The bearing arrangement of claim 4, wherein the mass ratio is about 45 to 55:55 to 45.

6. The bearing arrangement of claim 1, wherein the composite includes about 45 to 55% by weight of the CRBC.

7. The bearing arrangement of claim 1, wherein the resin is at least one thermoplastic resin selected from the group consisting of nylon 66, nylon 6, nylon 11, nylon 12, polybutylene terephthalate, polyethylene terephthalate, polypropylene, polyethylene, and polyacetal.

8. The bearing arrangement of claim 1, wherein the CRBC is in the form of particles having a mean particle size of about 300 µm or less.

9. The bearing arrangement of claim 8, wherein the mean particle size of the particles is about 10 to 200 µm.

10. The bearing arrangement of claim 8, wherein the particles of the CRBC are uniformly dispersed in the resin.

11. The bearing arrangement of claim 1, wherein the CRBC is uniformly dispersed in the resin.

12. The bearing arrangement of claim 1, wherein the composite includes at least one fibrous material selected from the group consisting of: inorganic fibers, synthetic fibers, and natural pulp fibers.

13. A bearing arrangement, comprising:
   a slide bearing having at least a part thereof formed of a composite, wherein the composite includes Carbonized Rice Bran Ceramic (CRBC) dispersed in a resin.

14. The bearing arrangement of claim 13, wherein the composite includes about 30–70% by weight of the CRBC.

15. The bearing arrangement of claim 14, wherein the composite includes about 45–55% by weight of the CRBC.

16. The bearing arrangement of claim 13, wherein the mass ratio of the CRBC and the resin is about 30 to 70:70 to 30.

17. The bearing arrangement of claim 16, wherein the mass ratio is about 45 to 55:55 to 45.

18. The bearing arrangement of claim 13, wherein the resin is at least one thermoplastic resin selected from the group consisting of nylon 66, nylon 6, nylon 11, nylon 12, polybutylene terephthalate, polyethylene terephthalate, polypropylene, polyethylene, and polyacetal.

19. The bearing arrangement of claim 13, wherein the CRBC is in the form of particles having a mean particle size of about 300 μm or less.

20. The bearing arrangement of claim 19, wherein the mean particle size is about 10 to 200 μm.

21. The bearing arrangement of claim 19, wherein the particles of the CRBC are uniformly dispersed in the resin.

22. The bearing arrangement of claim 13, wherein the CRBC is uniformly dispersed in the resin.

23. The bearing arrangement of claim 13, wherein the composite includes at least one fibrous material selected from the group consisting of: inorganic fibers, synthetic fibers, and natural pulp fibers.

24. A bearing arrangement, comprising:
a shaft; and
a bearing component, wherein at least a part of at least one of the shaft and the bearing component is formed of a composite including fine particles of Carbonized Rice Bran Ceramic (CRBC) uniformly dispersed in a resin, wherein the composite includes about 30–70% by weight of the CRBC.

25. The bearing arrangement of claim 24, wherein the composite includes about 45–55% by weight of the CRBC.

26. The bearing arrangement of claim 24, wherein the mass ratio between the particles and the resin is from about 30 to 70:70 to 30.

27. The bearing arrangement of claim 24, wherein at least one of the shaft and the bearing component is lubricated.

28. The bearing arrangement of claim 24, wherein the shaft is separated from the bearing component by a lubricant film.

29. A bearing arrangement, comprising:
a slide bearing, wherein at least a part of the slide bearing is formed of a composite including,
a resin, about 30–70% by weight of Carbonized Rice Bran Ceramic (CRBC) and at least one fibrous material selected from the group consisting of inorganic fibers, synthetic fibers, and natural pulp fibers, wherein at least one of the resin, the CRBC and the at least one fibrous material is uniformly dispersed in a resin.

30. A method for manufacturing a bearing component, comprising the steps of:
mixing CRBC and a resin to form a composite; and
forming the composite into at least a part of a first bearing component.

31. The method of claim 30, wherein the CRBC and the resins are mixed so that the CRBC constitutes about 30–70% by weight of the composite.

32. The method of claim 31, wherein the CRBC constitutes about 45–55% by weight of the composite.

33. The method of claim 30, wherein the first bearing component is a slide bearing.

34. The method of claim 30, further comprising the step of: mixing the CRBC and the resin so that the CRBC is uniformly dispersed in the resin.

35. The method of claim 30, wherein the first bearing component is molded into a slide bearing.

36. The method of claim 30, further comprising the step of: kneading the mixture of the CRBC and the resin.

37. The method of claim 30, further comprising the step of:
mixing at least one fibrous material selected from the group consisting of inorganic fibers, synthetic fibers and natural pulp fibers with the CRBC and the resin to form the composite.

* * * * *

UNITED STATES PATENT AND TRADEMARK OFFICE
CERTIFICATE OF CORRECTION

| | | |
|---|---|---|
| PATENT NO. | : 7,140,778 B2 | Page 1 of 1 |
| APPLICATION NO. | : 10/377851 | |
| DATED | : November 28, 2006 | |
| INVENTOR(S) | : Kazuo Hokkirigawa et al. | |

It is certified that error appears in the above-identified patent and that said Letters Patent is hereby corrected as shown below:

Title Page, Item (75) Inventors should read:
Inventors: Kazuo Hokkirigawa, Miyagi (JP)
          Motoharu Akiyama, Nagano (JP)
          Morinobu Kawamura, Nagano (JP)

Signed and Sealed this

Twenty-seventh Day of February, 2007

JON W. DUDAS
*Director of the United States Patent and Trademark Office*